(12) United States Patent
DeKoning et al.

(10) Patent No.: US 6,675,268 B1
(45) Date of Patent: Jan. 6, 2004

(54) METHOD AND APPARATUS FOR HANDLING TRANSFERS OF DATA VOLUMES BETWEEN CONTROLLERS IN A STORAGE ENVIRONMENT HAVING MULTIPLE PATHS TO THE DATA VOLUMES

(75) Inventors: Rodney A. DeKoning, Augusta, KS (US); Charles D. Binford, Wichita, KS (US); Michael J. Gallagher, Wichita, KS (US); Ray M. Jantz, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 375 days.

(21) Appl. No.: 09/735,086

(22) Filed: Dec. 11, 2000

(51) Int. Cl.[7] .................. G06F 13/372; G06F 13/18; G06F 12/06; G06F 13/16; G06F 13/368

(52) U.S. Cl. .................. 711/151; 711/150; 711/148; 710/240; 710/244; 710/45; 710/117; 710/124

(58) Field of Search .................. 710/40, 45, 107, 710/109, 36, 42, 41, 117, 124, 240, 244, 306; 711/5, 148, 151, 150, 152

(56) References Cited

U.S. PATENT DOCUMENTS

| | | | | |
|---|---|---|---|---|
| 4,041,472 A | * | 8/1977 | Shah et al. .................. | 710/306 |
| 4,481,572 A | * | 11/1984 | Ochsner ..................... | 710/117 |
| 4,611,275 A | * | 9/1986 | Garnier ...................... | 710/109 |
| 6,240,475 B1 | * | 5/2001 | Anubolu ..................... | 710/107 |
| 6,363,461 B1 | * | 3/2002 | Pawlowski et al. ......... | 711/158 |
| 6,424,656 B1 | * | 7/2002 | Hoebeke ..................... | 370/412 |
| 6,567,426 B1 | * | 5/2003 | van Hook et al. .......... | 370/535 |

* cited by examiner

Primary Examiner—B. James Peikari
(74) Attorney, Agent, or Firm—Suiter West PC LLO

(57) ABSTRACT

In a storage environment or storage area network having multiple host devices and at least one storage array, the host devices access logical data volumes stored on the storage array through array controllers disposed in the storage array. Multiple host devices can request access to shared ones of the logical data volumes through multiple paths to multiple array controllers, but each logical data volume is controlled or owned by only one array controller at a time. Thus, ownership of shared logical data volumes is transferred between the array controllers as necessary on behalf of the requesting host devices. To prevent ownership transfers from occurring too often, however, ownership of the logical data volumes is made exclusive, or "sticky," for a period of time after each transfer. During the exclusive ownership period of time, the ownership cannot be transferred. After expiration of the exclusive ownership period of time, ownership of the affected logical data volume is transferred if the transfer does not cause another host device to lose access to the same logical data volume, unless priorities between competing host devices permit one host device to take access away from the other host device.

21 Claims, 6 Drawing Sheets

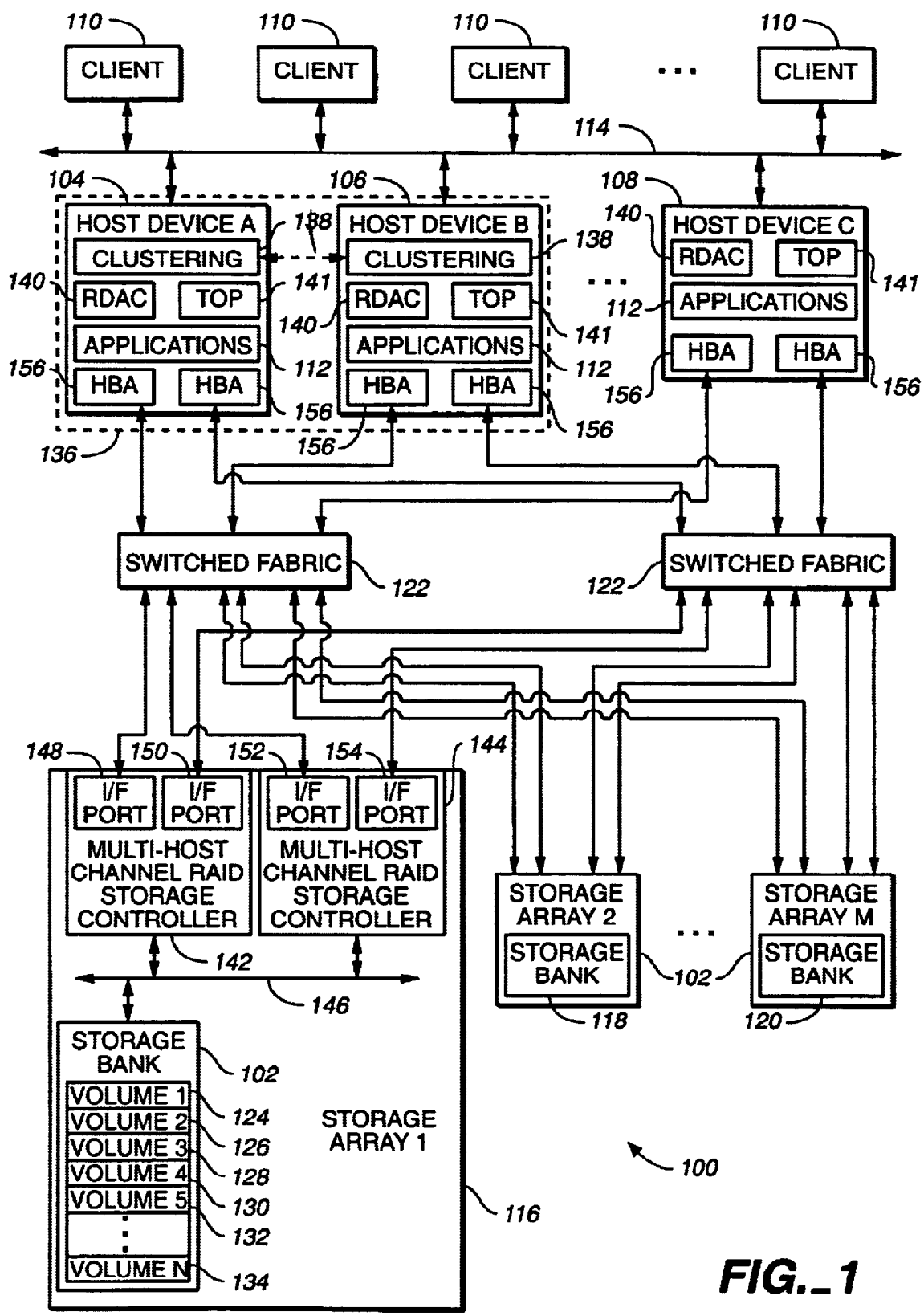
FIG._1

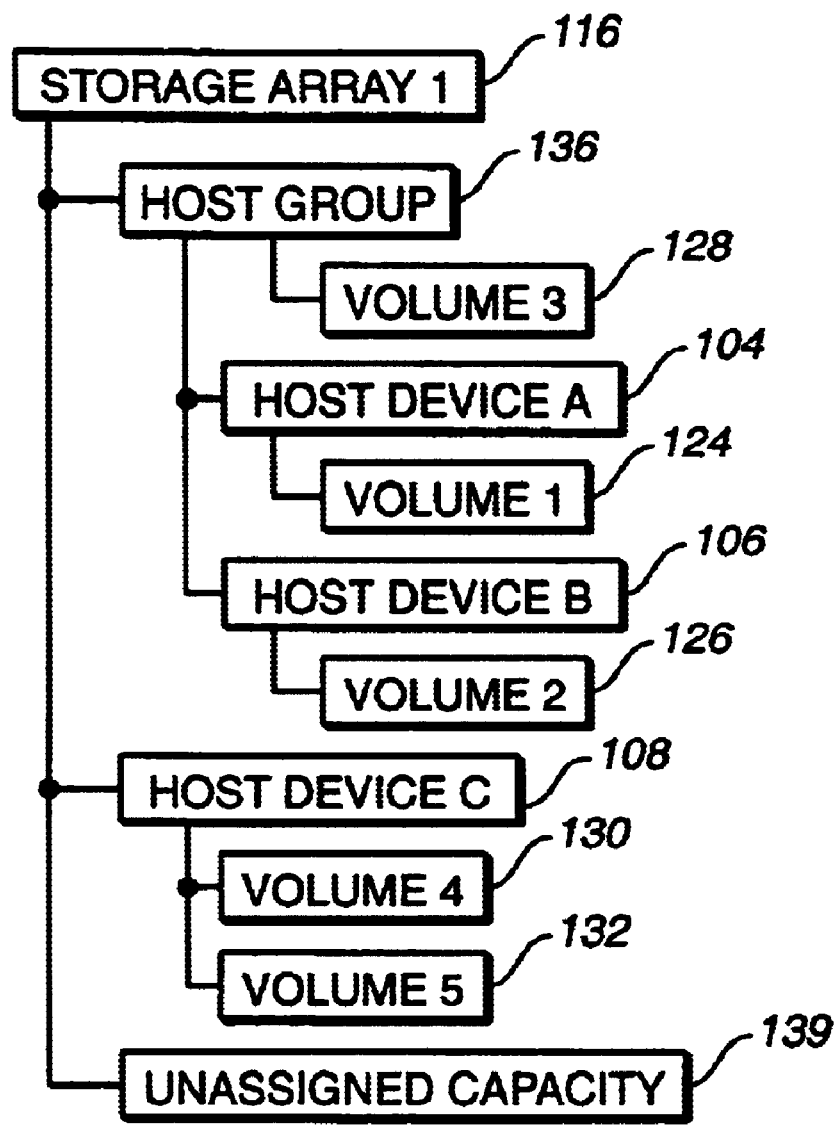
FIG._2

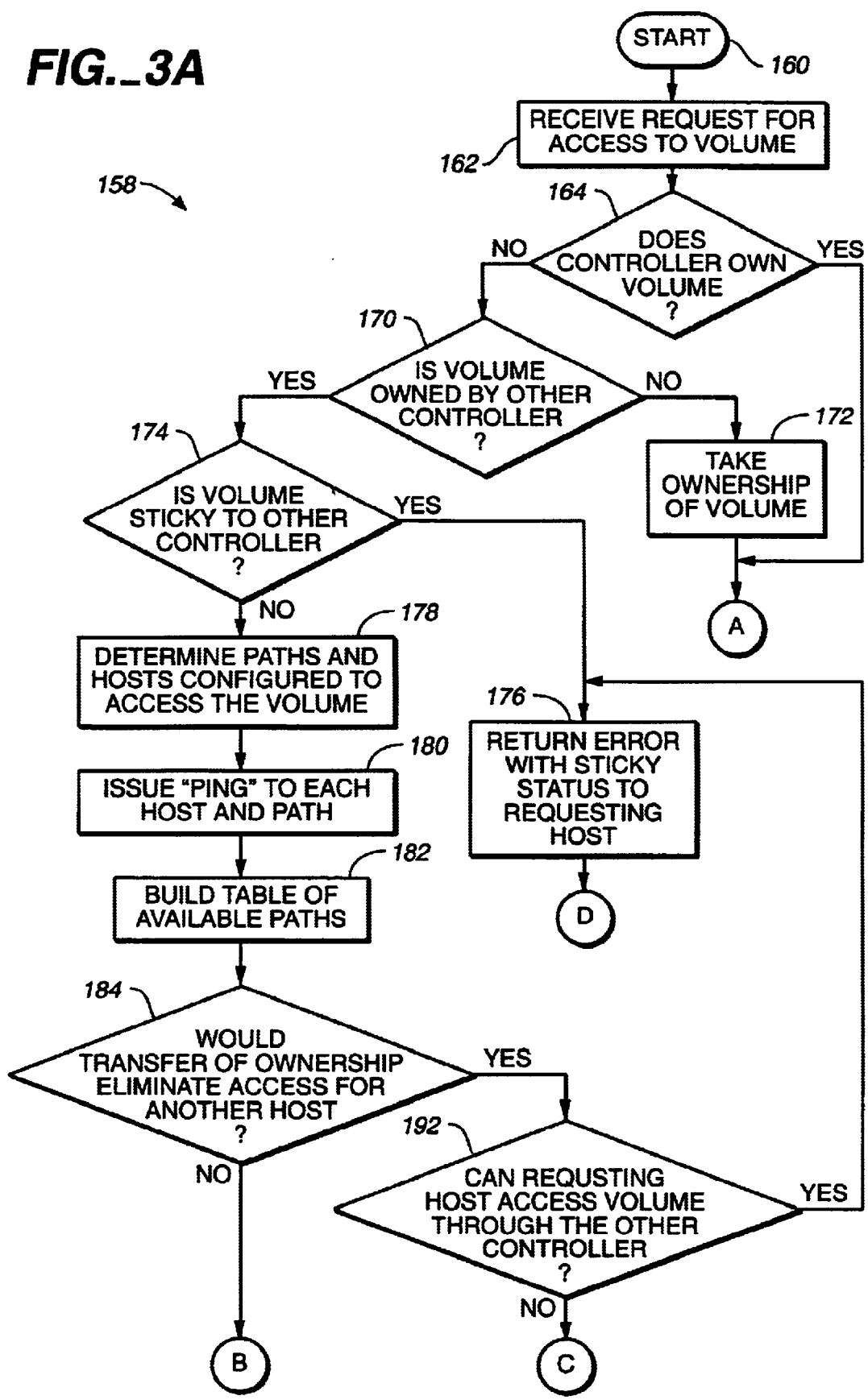
FIG._3A

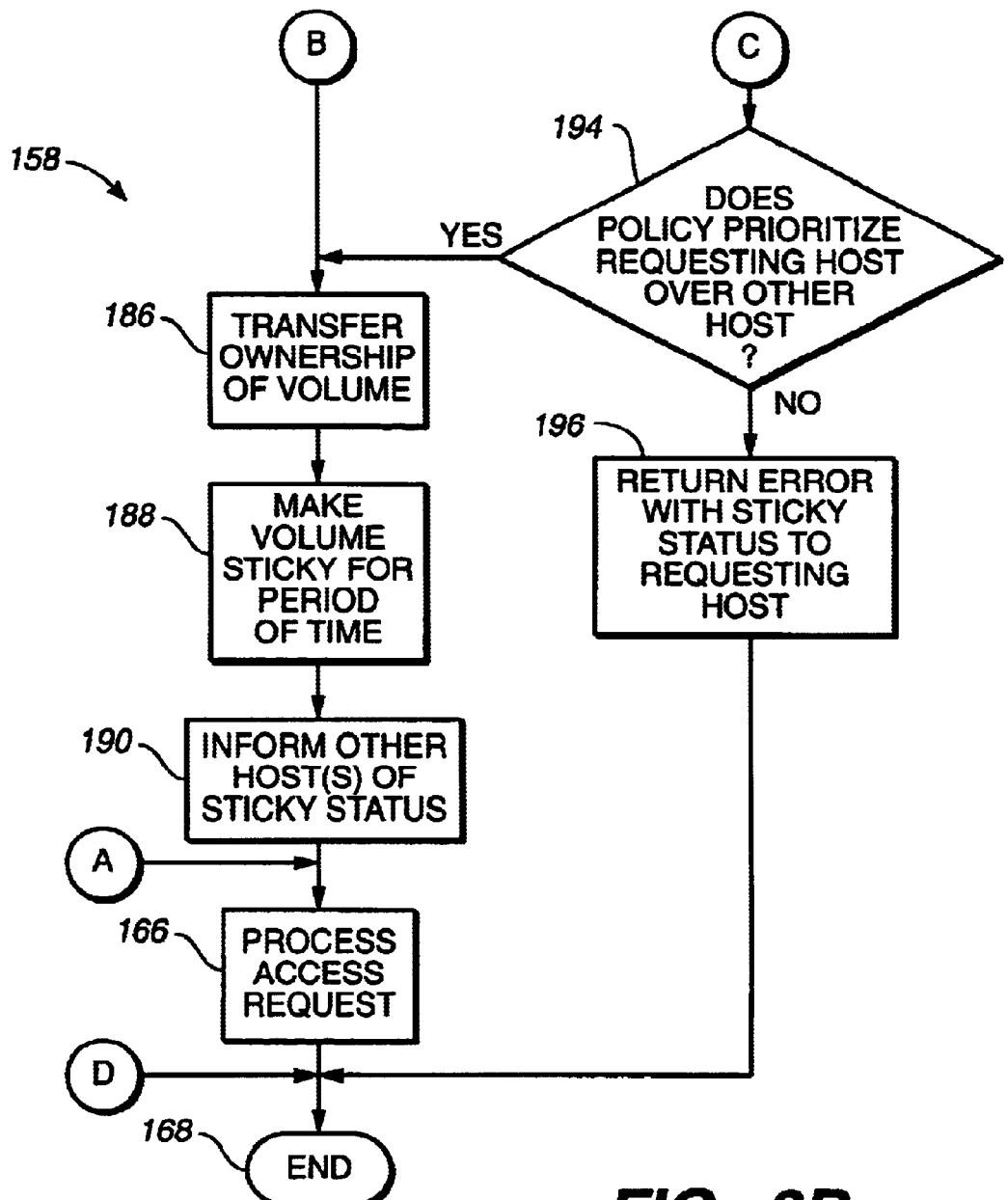
FIG._3B

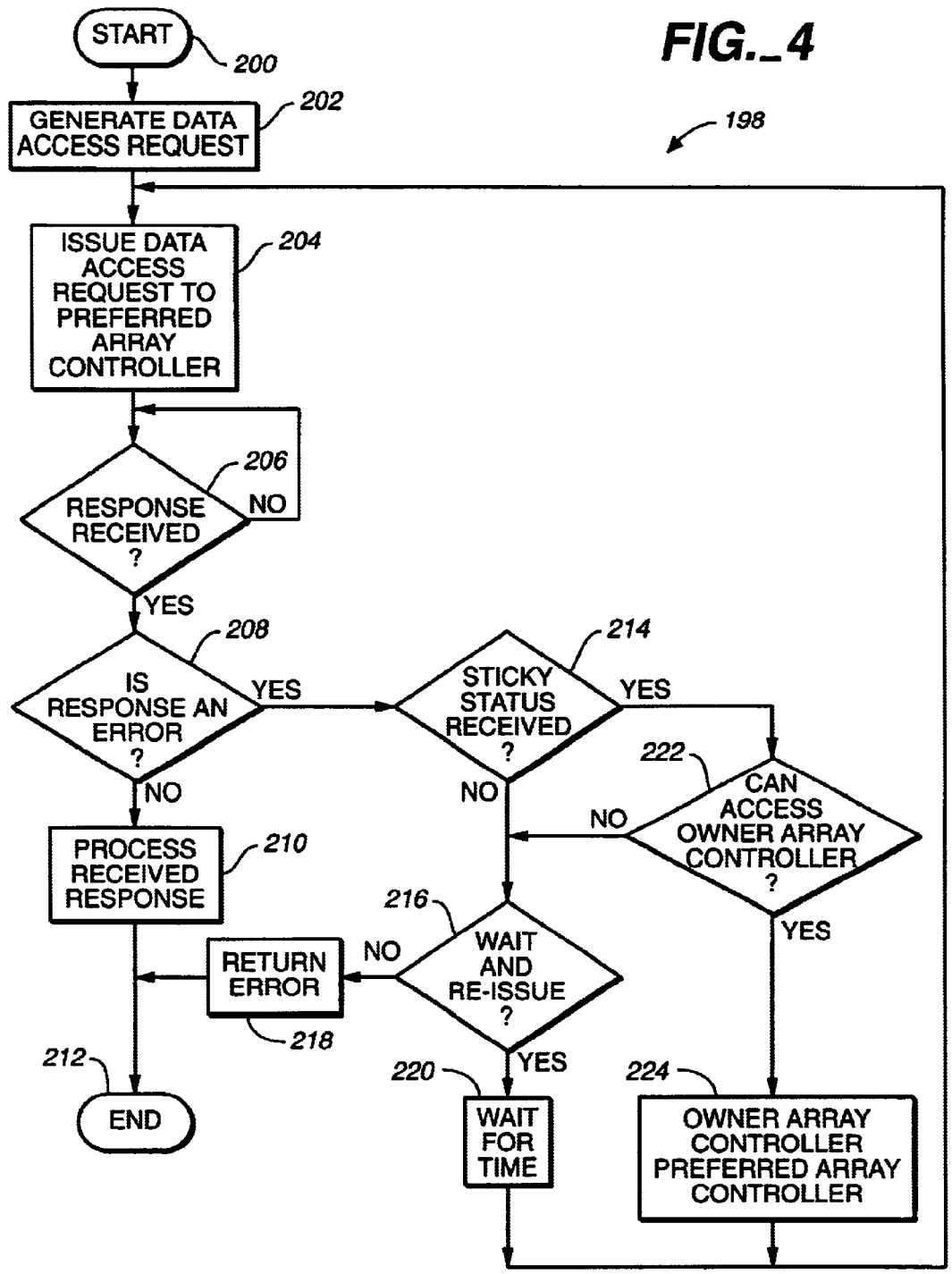

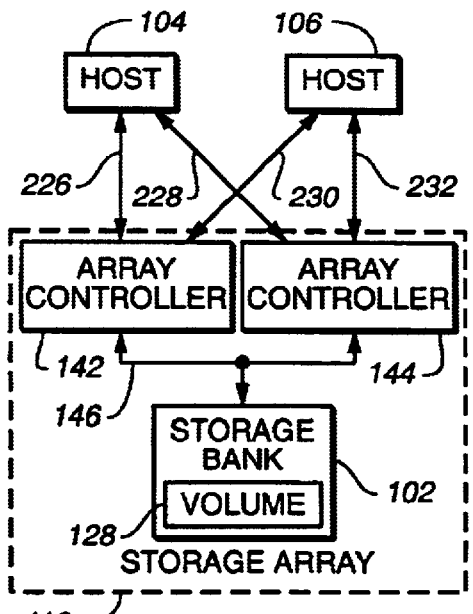
FIG._5
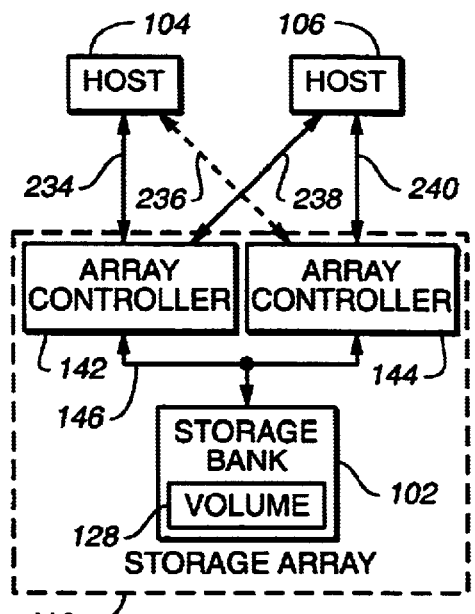
FIG._6
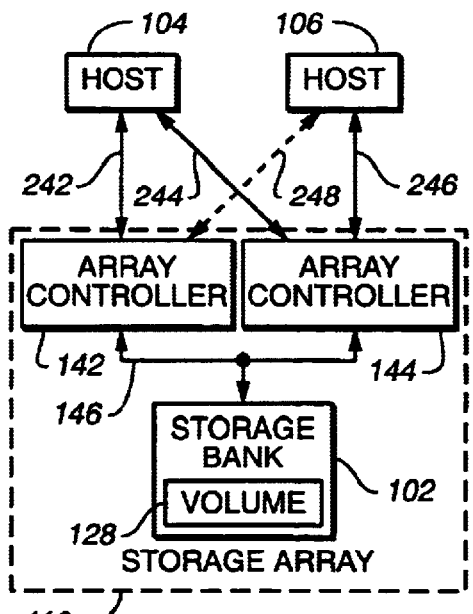
FIG._7
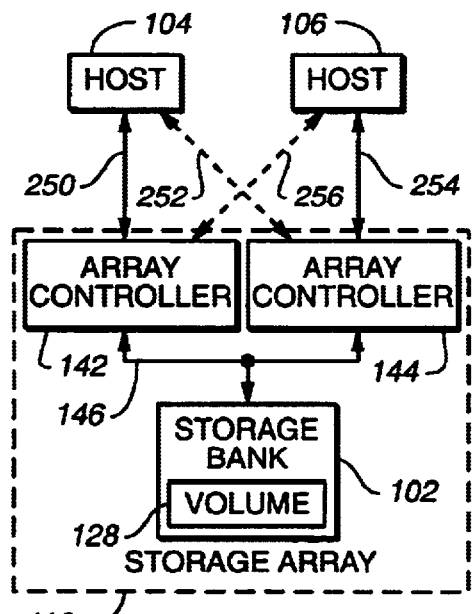
FIG._8

METHOD AND APPARATUS FOR HANDLING TRANSFERS OF DATA VOLUMES BETWEEN CONTROLLERS IN A STORAGE ENVIRONMENT HAVING MULTIPLE PATHS TO THE DATA VOLUMES

FIELD OF THE INVENTION

This invention relates to data storage in a computerized storage area network (SAN) or system utilizing redundant disk array controllers (RDAC's). More particularly, the present invention relates to a new and improved technique of managing transfers of access control of logical data volumes between the RDAC's. When a host device sends a data access request to one of the RDAC's for access to a logical data volume that is controlled by another one of the RDAC's, it is determined whether the logical data volume is currently exclusively controlled by another RDAC and the SAN is analyzed to determine whether to transfer access control of the logical data volume to the RDAC that received the data access request.

BACKGROUND OF THE INVENTION

A storage area network (SAN) typically includes a plurality of host devices connected through a switched fabric to a plurality of storage arrays. The host devices access a plurality of logical data volumes present on the plurality of storage arrays, usually on behalf of a plurality of client devices, which are typically connected to each host device. Each storage array is connected to one or more host devices through the switched fabric.

Each storage array includes multiple individual storage devices, typically arranged in a RAID (Redundant Array of Independent Drives) configuration. The RAID storage devices supply data storage space for the logical data volumes. The logical data volumes are commonly striped across multiple storage arrays, so host devices that access a given logical data volume must have a connection to each of the storage arrays that contains a portion of the logical data volume. The individual storage devices include hard drives, compact disk (CD) drives, tape drives and the like.

Each storage array also commonly includes more than one array controller, through which the storage devices and logical data volumes are accessed. Each array controller connects to the switched fabric. Thus, a data transfer path between one of the host devices and one of the storage arrays is established from the one host device, through the switched fabric, to the one array controller.

Some of the host devices may access the same storage array through more than one data transfer path through the switched fabric. Also, more than one host device may access the same logical data volume through different data transfer paths on behalf of the same or different client devices. Therefore, more than one array controller of a storage array may receive a data access request to the same logical data volume, or portion thereof, present on the storage array.

When one of the array controllers of a given storage array processes a data access request to a given logical data volume, that array controller is said to have access control or "ownership" of the logical data volume. When one array controller has ownership of the logical data volume, no other array controller in the storage array can access the logical data volume.

When an array controller receives a data access request to a logical data volume that the array controller does not currently own, it transfers ownership of the logical data volume to itself in an automatic volume transfer (AVT) process and then processes the data access request. When two or more host devices need to access the same logical data volume, but do so through different array controllers, then the array controllers repetitively transfer ownership of the logical data volume back and forth between themselves. The repetitive ownership transferring is called "thrashing." Thrashing can severely degrade the performance of data accesses to the affected logical data volume, since significant time is taken up performing the AVT processes, instead of accessing the affected logical data volume.

When two or more host devices can access the same logical data volume through the same common array controller, then thrashing and unnecessary AVT processes are avoided, because the common array controller can process all of the data access requests. However, sometimes more than one host device cannot establish data transfer paths to the same array controller, because one host device may never have had a physical connection to the array controller or one existing physical path may have become inoperative. Therefore, transferring ownership of the logical data volume may cause one of the host devices to completely lose access to the logical data volume, yet not transferring ownership may deny access for another host device.

It is with respect to these and other background considerations that the present invention has evolved.

SUMMARY OF THE INVENTION

The present invention prevents excessive thrashing between array controllers in a storage area network (SAN) when more than one host device is attempting to access the same logical data volume through different array controllers. Thrashing is prevented by granting ownership of a logical data volume to a particular array controller for a period of exclusivity. During the exclusivity period, ownership of the logical data volume may not be transferred to another array controller. The logical data volume is said to be "sticky" to the particular array controller for the exclusivity, or "sticky," time period, e.g. about five to ten seconds or longer depending on the situation.

The present invention also considers whether a host device may lose access to a needed logical data volume that it is currently accessing before permitting transfer of ownership of the logical data volume from the current-owner array controller to a nonowner array controller that has received a data access request to the logical data volume. Therefore, before transferring ownership of the logical data volume, the nonowner array controller examines a portion of the current topology of the SAN to determine whether any host device that requires access to the logical data volume would lose access to the logical data volume if ownership were to be transferred. The topology is the set of all connections between the host devices and the storage arrays. In this case, the nonowner array controller determines those available connections to the storage array of which it is a part, including connections through other array controllers in the same storage array. If, according to the available connections, any host device would lose access to the logical data volume upon transferring ownership from the current-owner array controller to the nonowner array controller, then preference is given to not transferring ownership. Ownership transfer is granted only if the requesting host device cannot establish a data transfer path to the current-owner array controller and the requesting host device has priority for accessing the logical data volume over the host device that is currently accessing the logical data volume.

These and other improvements are achieved by accessing a logical data volume in a storage area network that has a plurality of host devices and a storage array. The logical data volume is located on the storage array. The storage array has a plurality of array controllers through which the host devices access the logical data volume. A first array controller receives a request to access the logical data volume. The logical data volume, however, is currently owned by a second array controller, so the access request requires transfer of the ownership of the logical data volume from the second array controller to the first array controller. It is determined whether the ownership of the logical data volume by the second array controller is within an exclusive period of time. If so, then the ownership transfer is denied. However, if the ownership by the second array controller is no longer exclusive, then the ownership transfer is granted.

It is preferable that, upon granting the ownership transfer, another exclusive period of time begins. Thus, the same method may be used by the second array controller when it receives a subsequent request to access the logical data volume. It is also preferable upon granting the ownership transfer that the host devices be informed that the first array controller now has ownership of the logical data volume. Thus, the host devices may determine to use the first array controller for the subsequent access requests, so that another ownership transfer can be avoided. It is further preferable, when it is determined that ownership is exclusive to the second array controller, that information be sent to the host device that issued the access request indicating that the second array controller has exclusive ownership of the logical data volume. Then the requesting host device preferably re-issues the access request to the second array controller.

Upon a determination that ownership of the logical data volume is not exclusive, it is preferable also to determine whether any other host devices, which are currently accessing the logical data volume through the second array controller, can also access the logical data volume through the first array controller. There is a preference not to transfer ownership, so that thrashing will be reduced. However, if ownership is no longer exclusive and all the other host devices, that are currently accessing the logical data volume, can establish a data transfer path through the first array controller, then the ownership transfer is preferably granted. On the other hand, if any one of the other host devices cannot access the first array controller and would lose access to the logical data volume if the ownership transfer were to be granted, then it is preferable to determine whether the requesting host device can also access the logical data volume through the second array controller. If so, then it is preferable to deny the ownership transfer and to inform the requesting host device that the second array controller has ownership, so the requesting host device can re-issue its access request through the second array controller. However, if the requesting host device cannot access the second array controller, then there is a conflict between the requesting host device and the one other host device, since denying the ownership transfer will also deny the requesting host device access to the logical data volume, while granting the ownership transfer will cause the one other host device to lose access to the logical data volume. Either way, one of the host devices will not have access to the logical data volume. To resolve the conflict, since there is a preference not to transfer ownership, the ownership transfer will be granted only if the requesting host device has priority over the other host device for accessing the logical data volume.

The previously mentioned and other improvements are also achieved in a method of accessing the logical data volume wherein the access request is issued from the requesting host device to the first array controller. Under conditions where the first array controller receives the access request, but the second array controller currently has ownership of the logical data volume, the access request requires an ownership transfer. It is then determined whether the ownership transfer would eliminate access to the logical data volume for any other host device(s). If so, then the ownership transfer is denied. Otherwise, the ownership transfer is granted.

If the ownership transfer would eliminate access for the other host device(s), then it is preferable to determine whether the requesting host device can access the logical data volume through the second array controller. If so, then it is also preferable to inform the requesting host device that the second array controller has exclusive ownership of the logical data volume, so the requesting host device may re-issue the access request to the second array controller and not have to wait for the first array controller to be able to take ownership of the logical data volume. On the other hand, if the requesting host device cannot access the logical data volume through the second array controller, then it is further preferable to determine whether the requesting host device has priority over the other host device for accessing the logical data volume. If so, then the ownership transfer is granted. Otherwise, the ownership transfer is denied.

The previously mentioned and other improvements are also achieved in a storage area network that comprises a storage array, first and second array controllers disposed within the storage array and first and second (or more) host devices connected to the storage array at the first and second array controllers, respectively. The storage array also contains a plurality of logical data volumes, including a shared logical data volume, all of which the host devices access through the array controllers. Each array controller may have ownership of one or more of the logical data volumes, such that each logical data volume is owned by only one array controller at a time. Such ownership is exclusive for an exclusive period of time, during which the ownership cannot be transferred. Thus, ownership can be transferred between the array controllers only after the expiration of the exclusive period of time and upon the receipt of an access request from one of the host devices. The first host device issues a request to access the shared logical data volume through the first array controller, and the second host device issues an access request for the same logical data volume through the second array controller. Upon receiving the access request from the first host device, the first array controller establishes ownership (assuming an "initial" access request) of the shared logical data volume and thereupon starts the exclusive period of time. Upon receiving the second access request, however, the second array controller determines whether the first array controller has exclusive ownership, rejects the second access request if ownership is still exclusive, and transfers ownership of the shared logical data volume to the second array controller if the exclusive period of time has expired.

It is preferable that the second array controller restarts the exclusive period of time upon transferring ownership to itself of the shared logical data volume and also notifies the host devices of the exclusive ownership status. The second array controller also preferably determines whether the ownership transfer of the shared logical data volume would eliminate access for the first host device. If not, then the second array controller proceeds to transfer ownership to itself of the shared logical data volume. Otherwise, the second array controller preferably determines whether the second host device can access the shared logical data volume through the first array controller. If so, then the second array controller preferably rejects the access request. Thus, the second host device can re-issue the access request through the first array controller, since the second host device is known to have access thereto. If the second host device cannot access the shared logical data volume through the first array controller, however, then the second array controller preferably determines whether the second host device has priority over the first host device for accessing the shared logical data volume. If so, then the second array controller preferably proceeds with transferring to itself the ownership of the shared logical data volume.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a storage area network (SAN) incorporating the present invention.

FIG. 2 is a block diagram of a logical relationship between host devices and logical data volumes in the SAN shown in FIG. 1.

FIGS. 3A and 3B collectively form a flowchart of a procedure to grant or deny transfer of ownership of a logical data volume from one array controller to another array controller in the SAN shown in FIG. 1.

FIG. 4 is a flowchart of a procedure to issue a data access request and process a response thereto by a host device in the SAN shown in FIG. 1.

FIGS. 5, 6, 7 and 8 are simplified block diagrams of the SAN shown in FIG. 1 illustrating different exemplary situations that may be encountered by the procedure shown in FIGS. 3A and 3B.

DETAILED DESCRIPTION

A data storage environment, such as a storage area network (SAN) 100 shown in FIG. 1, generally includes conventional storage banks 102 of several conventional storage devices (not shown)(e.g. hard drives, tape drives, etc.) that are accessed by one or more conventional host devices 104, 106 and 108. The host devices 104–108 typically access the storage devices on behalf of one or more conventional client devices 110 or applications 112 running on the host devices 104–108. Each host device 104–108 is connected to one or more of the client devices 110 by a conventional communication link 114, such as a local area network (LAN). The storage banks 102 are incorporated in conventional high-volume, high-bandwidth storage arrays 116, 118 and 120. Conventional switched fabrics 122 connect the host devices 104–108 to the storage arrays 116–120. In this case, the presence of two switched fabrics 122 enables multiple data transfer paths between the host devices 104–108 and the storage arrays 116–120.

Storage space in each of the storage banks 102 within the storage arrays 116–120 is configured into logical data volumes 124, 126, 128, 130,132 and 134. The host devices 104–108 utilize one or more of the logical data volumes 124–134 to store data for the applications 112 or the client devices 110. Some of the logical data volumes 124–134 are utilized by more than one host device 104–108 as "shared" volumes.

The host devices 104–108 issue data access requests, on behalf of the client devices 110 or applications 112, to the storage arrays 116–120 for access to the logical data volumes 124–134. Some of the host devices, e.g. 104 and 106, may be combined into a host cluster, or group 136, that together can service some or all of the client devices 110 under cooperative functioning of conventional clustering software 138.

FIG. 2 shows an exemplary logical relationship between the host devices 104–108 and the logical data volumes 124–134 in the storage array 116. The logical data volumes 124 and 126 are associated with the host devices 104 and 106, respectively. The logical data volumes 130 and 132 are associated with the host device 108. The logical data volume 128 is associated with both of the host devices 104 and 106 functioning as the host cluster 136. Any remainder of the storage space in the storage array 116 is unassigned capacity 139. The host devices 104–108 utilize the of the logical data volumes 124–134 with which they are associated.

Returning to FIG. 1, at least some of the host devices 104–108 can access some of the storage arrays 116–120 and logical data volumes 124–134 through more than one data transfer path through the switched fabrics 122, as described below. Thus, the host devices 104–108 utilize conventional multi-pathing redundant disk array controller (RDAC) software 140 to issue the data access requests. The RDAC software 140 also keeps track of the preferred and/or accessible data transfer paths.

The host devices 104–108 also include conventional topological software (TOP) 141. The topological software 141 issues initial input/output (I/O) requests to all recognized storage array controllers 142 and 144 through all available data transfer paths to the storage arrays 116–120. The initial I/O requests supply host identifier and type information of the host devices 104–108 to the storage arrays 116–120. After the storage arrays 116–120 receive the initial I/O requests through each of the available data transfer paths, the host devices 104–108 are said to be "logged-in" to the storage arrays 116–120. A user or system administrator may also manually log in a host device to the storage arrays 116–120. The storage arrays 116–120 then determine an initial host-to-storage "topology" for each of the storage arrays 116–120. The host devices 104–108 that are logged into each storage array 116–120 and the data transfer paths to the logged-in host devices 104–108 define the topology for the connections to each storage array 116–120.

The storage arrays 116–120 (as shown in storage array 116) typically have more than one conventional multi-host channel RAID storage controller (array controller) 142 and 144. The array controllers 142 and 144 work in concert to manage the storage array 116 and to handle the data access requests to the logical data volumes 124–134 that are received by the storage array 116. The array controllers 142 and 144 connect to a set of conventional shared buses 146, which in turn connects to the storage bank 102. The array controllers 142 and 144 send and receive data to and from the logical data volumes 124–134 through the shared bus 146.

The array controllers 142 and 144 send and receive data, data access requests, message packets and other communication information to and from the host devices 104–108 through conventional interface (I/F) ports 148, 150, 152 and 154 connected to the switched fabrics 122. The host devices 104–108 send and receive the communication information through conventional host bus adapters (HBA's) 156 connected to the switched fabrics 122.

A typical data access request for one of the logical data volumes 124–134 (e.g. logical data volume 128) originates at one of the host devices 104–108 (e.g. host device 104), which selects a data transfer path through which to transmit the data access request to and receive the response from the storage array 116–120 (e.g. storage array 116). For the selected data transfer path, the host device 104 specifies one of its host bus adapters 156 and one of the array controllers 142 or 144 of the storage array 116 (e.g. array controller 142).

When the specified array controller 142 receives the data access request, the array controller 142 must take "ownership" of the requested logical data volume 128, if it doesn't already have ownership, in order to process the data access request. "Ownership" of the logical data volume 128 allows the array controller 142 to process data access requests to the logical data volume 128, while the other array controller 144 cannot do so, until the other array controller 144 transfers ownership to itself. Therefore, if the other array controller 144 currently has ownership of the logical data volume 128 when the array controller 142 receives the data access request to the logical data volume 128, then the array controller 142 will attempt to transfer ownership through an automatic volume transfer (AVT) process to itself.

Prior art array controllers permit the occurrence of the AVT process as soon as the data access request is received by the non-owner array controller, and prior art RDAC software supports this occurrence. The present invention, however, can reject the ownership transfer, or deny the data access request and refuse to permit the AVT process to occur, in certain circumstances. In that case, the array controller 142 sends an appropriate error message to the RDAC software 140 in the host device 104 describing the reason for not processing the data access request. For example, ownership transfer of the logical data volume 128 may be rejected when an insufficient amount of time has passed since the last AVT process transferred ownership of the logical data volume 128 between the array controllers 142 and 144. Additionally, ownership transfer can be rejected when such transfer would cause another host device 106 and/or 108 to lose access to the logical data volume 128 when the other host device 106 and/or 108 requires such access.

When either array controller 142 or 144 receives ownership of a logical data volume 124–134, a "sticky period" of time begins, during which the logical data volume 124–134 is said to be "sticky" to the owner array controller 142 or 144. Typically, a timer is set to time the sticky period. "Stickiness" of the logical data volume 124–134 indicates a temporary (about five to ten seconds or longer) ownership exclusivity by the owner array controller 142 or 144. For example, the array controller 142 will not allow transfer of ownership of logical data volume 128 away from the array controller 144 as long as the logical data volume 128 is sticky to the array controller 144. After the sticky period has expired, however, array controller 142 can transfer ownership of the logical data volume 128 away from the current owner, array controller 144, and begin a new sticky period, during which the logical data volume 128 is sticky to the array controller 142, the new owner.

The SAN configuration in FIG. 1 shows the switched fabrics 122 connected to all of the host devices 104–108 and all of the storage arrays 116–120 and the communication link 114 connected to all of the client devices 110 and all of the host devices 104–108. In this configuration, therefore, it is possible for any host device 104–108 to access any logical data volume 124–134 in any storage array 116–120 through any switched fabric 122, array controller 142 or 144 and I/F port 148–154. It is also possible for any client device 110 to access any host device 104–108. In this manner, multiple or redundant data transfer paths may be established for data access through the SAN 100, thereby ensuring data availability and high-speed communication. Additionally, the sticky periods for the logical data volumes 124–134 will prevent excessive ownership transfers of the logical data volumes 124–134 between the array controllers 142 and 144.

SAN 100 represents a SAN configuration in which all possible connections are available between each host device 104–108 and each storage array 116–120 for redundancy in data transfer paths. However, it is common for less than all of the possible connections to be made available in such a SAN 100, typically for cost savings. In other words, each of the switched fabrics 122 may not be connected to every one of the host devices 104–108 or every one of the storage arrays 116–120 or array controllers 142 and 144. Instead, some of the storage arrays 116–120 and host devices 104–108 may have more than one connection to the switched fabrics 122 and others may have only one connection. Thus, different numbers of data transfer paths through the switched fabrics 122 may be available to different ones of the host devices 104–108 for accessing each of the logical data volumes 124–134. Additionally, different numbers of data transfer paths may be available at different times, since one data transfer path may become inoperative (e.g. due to a disconnected physical cable) or another data transfer path may become available (e.g. when a new switched fabric 122 is added to the SAN 100 between the host devices 104–108 and the storage arrays 116–120). Likewise, the communication link 114 may not connect all of the host devices 104–108 and all of the client devices 110. Instead, there may be separate communication links 114 that each connect only a portion of the host devices 104–108 and client devices 110. In this manner, some level of data availability and/or communication speed may be sacrificed for cost savings.

In a SAN in which not all of the possible connections for complete redundancy have been made (either by design or due to a failed path), one host device 104–108 may not have the same set of possible data transfer paths to the same logical data volume 124–134 as another one of the host devices 104–108 might have. Therefore, when ownership of one of the logical data volumes 124–134 changes between array controllers 142 and 144, one or more of the host devices 104–108 may lose current access to the logical data volume 124–134. Under the present invention, however, the array controllers 142 and 144 determine whether a host device 104–108 will lose access to a needed logical data volume 124–134 if an ownership transfer were to occur and determine whether to reject the ownership transfer to prevent the loss of access. Whether a host device 104–108 will lose access to the logical data volume 124–134 is determined from the topology of the SAN 100. For example, if host devices 104 and 106 share logical data volume 128, but host device 106 can access the logical data volume 128 only through the array controller 144, then when the array controller.144 currently has ownership and host device 104 sends a data access request through array controller 142, the array controller 142 may refuse to transfer ownership of the logical data volume 128 to itself, even if the logical data volume 128 is not sticky to the array controller 144.

If the logical data volume 128 is sticky to the array controller 144, then array controller 142 will refuse to transfer ownership to itself and will reject the data access request from host device 104 without regard to any other considerations. However, if the logical data volume 128 is not sticky to the array controller 144 and the host device 106 cannot access the logical data volume 128 through array controller 142, then array controller 142 will transfer ownership to itself and process the data access request from host device 104 only if the host device 104 has priority over the host device 106. Such priority is typically set by the user or system administrator.

When the array controller 142 receives the data access request from the host device 104 to access the logical data volume 128, the array controller 142 not only determines whether any of the other host devices 106 and 108 will lose needed access to the logical data volume 128, but the array controller 142 also uses the topology of the SAN 100 to determine whether the requesting host device 104 can potentially access the logical data volume 128 through the current owner array controller 144. In this manner, the array controller 142 can reject the data access request without having to consider whether the requesting host device 104 has priority over the other host device 106 or 108 if the host device 104 can access the logical data volume 128 through the same array controller 144 as can the other host device 106 or 108. If the requesting host device 104 cannot access the logical data volume 128 through the same array controller 144 as can the other host device 106 or 108, and the other host device 106 or 108 cannot access the logical data volume through the array controller 142, then the array controller 142 refuses to transfer to itself the ownership of the logical data volume 128, unless the requesting host device 104 has priority over the other host device 106 or 108.

When the array controller 142 rejects the data access request from the host device 104 because ownership transfer of the desired logical data volume 128 will cause one of the other host devices 106 or 108 to lose needed access to the same logical data volume 128, the array controller 142 returns an error message to the requesting host device 104 indicating that the data access request cannot be processed and also indicating the identity of the array controller 144 that has current ownership of the logical data volume 128. Therefore, if the requesting host 104 has access to the current owner array controller 144, then the host device 104 can immediately select to reissue the data access request through the array controller 144. Otherwise, the requesting host device 104 waits and later reissues the data access request to the array controller 142 or returns an error message to the client device 110 or application 112 that requested the data.

The array controller 142 or 144 keeps a record of the host devices 104–108 that are "logged into" it, or have established access to the array controller 142 or 144. The array controller 142 or 144 also keeps track of the I/F port 148–154 and data transfer paths through the switched fabrics 122 that connect the array controller 142 or 144 to the logged-in host devices 104–108. This record-keeping includes multiple data transfer paths, when available, to the same host device 104–108. The array controller 142 or 144 also periodically initiates a conventional communication operation (a.k.a. a "ping" operation) to determine whether the data transfer paths to its logged-in host devices 104–108 are connected (i.e. to determine the current topology). In this manner, the array controller 142 or 144 can logically determine whether its logged-in host devices 104–108 still have access to the logical data volumes 124–134. Thus, the array controller 142 or 144 can determine which array controller 142 or 144 should be provided ownership of each of the logical data volumes 124–134 and whether a data access request will be processed.

Upon a transfer of ownership of one of the logical data volumes 124–134, the new owner array controller 142 or 144 preferably sends a notification to each of the logged-in host devices 104–108 indicating the new ownership of the logical data volume 124–134, so the logged-in host devices 104–108 can determine the array controller 142 or 144 to which succeeding data access requests should be sent. Alternatively, the host devices 104–108 periodically poll each path to each array controller 142 and 144 to determine whether they can access their needed logical data volumes 124–134 through the same array controller 142 or 144 that was last used for such access. If not, then the host devices 104–108 transfer to whichever array controller 142 or 144 and data access path that is available before the next data access request. In either case, the host devices 104–108 avoid the possibility of receiving an error in response to a data access request sent to the wrong array controller 142 or 144.

An exemplary procedure 158 performed by the array controller 142 (FIG. 1) for responding to a data access request issued by the host device 104 (FIG. 1) for access to the logical data volume 128 (FIG. 1), including determining whether to transfer ownership of the logical data volume 128 from the other array controller 144 (FIG. 1) to the array controller 142, is shown in FIGS. 3A and 3B. The procedure 158 begins at step 160. At step 162, the array controller 142 receives the data access request for the logical data volume 128. At step 164, the array controller 142 determines whether it has ownership of the logical data volume 128. If so, the array controller 142 proceeds to step 166 (FIG. 3B) to process the data access request in a conventional manner. The procedure 158 then ends at step 168. If the determination at step 164 is negative, however, the array controller 142 determines whether the logical data volume 128 is currently owned by another array controller (e.g. array controller 144) at step 170. If not, then the array controller 142 is free to take ownership of the logical data volume 128 at step 172 and then proceed to step 166 to process the data access request: The procedure 158 then ends at step 168.

If the determination at step 170 is positive, i.e. the logical data volume 128 (FIG. 1) is owned by the array controller 144 (FIG. 1), then at step 174, the array controller 142 (FIG. 1) determines whether the logical data volume 128 is sticky to the array controller 144. If so, then the array controller 144 retains exclusive ownership, and the array controller 142 returns an error message, at step 176, to the requesting host device 104 (FIG. 1) indicating that the data access request cannot be processed and that the logical data volume 128 is sticky to the array controller 144. The procedure 158 then ends at step 168. The requesting host device 104 (FIG. 1), under control of the RDAC software 140 (FIG. 1), either waits and reissues the data access request through the same array controller 142 or immediately reissues the data access request through the other array controller 144, if the host device 104 has access thereto, as described below with reference to FIG. 4.

If the determination at step 174 is negative, indicating that the logical data volume 128 (FIG. 1) is not sticky to the other array controller 144 (FIG. 1), then the array controller 142 (FIG. 1) proceeds to determine (at steps 178, 180, 182 and 184) whether there are any topological problems that would prevent transfer of the ownership of the logical data volume 128 to the array controller 142. At step 178, the array controller 142 determines the logged-in host devices 104–108 (FIG. 1) that have been configured to access the logical data volume 128 and the data transfer paths that were previously found to be available for such access. This information is typically already stored by the array controller 142, so the array controller 142 recalls this information from storage. In the example illustrated in FIG. 2, the other host device 106, as a member of the host group 136, will have been logged-in for access to the shared logical data volume 128. Additionally, the other array controller 144 is instructed to perform the same determination. At step 180, the array controllers 142 and 144 query the host devices 104 and 106 by issuing the conventional "ping" operations to each of the logged-in host devices 104 and 106 through each of the data transfer paths. At step 182, the array controllers 142 and 144 assemble tables of the actual available data transfer paths and the accessible host devices 104 and 106 as determined by the ping operations in step 180. The tables represent the topology of the SAN 100 (FIG. 1).

Given the available host devices 104 and 106 (FIG. 1) and data transfer paths determined in step 182 and the desired host devices 104 and 106 and data transfer paths determined in step 178, the array controller 142 (FIG. 1) determines, at step 184, whether transfer of ownership of the logical data volume 128 (FIG. 1) on behalf of the requesting host device 104 from array controller 144 (FIG. 1) to array controller 142 would eliminate access for the other host device 106. In other words, it is determined whether the host device 106 can establish a data transfer path to the array controller 142. If the determination at step 184 is negative, then there are no topological problems preventing the transfer of ownership, so the array controller 142 transfers ownership of the logical data volume 128 from the array controller 144 to itself at step 186. At step 188, the array controller 142 makes the logical data volume 128 sticky to the array controller 142 for the sticky time period. At step 190, the other host devices 106 and 108 are informed of the new sticky status of the logical data volume 128, either upon the ownership transfer to the array controller 142 or upon the next access request from the host devices 106 and 108. The other host devices 106 and 108 record the new sticky status of the logical data volume 128, so that if either of the other host devices 106 or 108 needs to access the logical data volume 128, the host device 106 or 108 can do so through the new owner array controller 142. The data access request is then processed in a conventional manner at step 166 and the procedure 158 ends at step 168.

If the determination at step 184 is positive, indicating that transfer of ownership of the logical data volume 128 (FIG. 1) would eliminate access for the other host device 106 (FIG. 1), then it is preferable not to transfer ownership. However, at step 192, the array controller 142 (FIG. 1) determines, using the actual and desired information assembled above in steps 178, 180 and 182, whether the requesting host device 104 (FIG. 1) can access the logical data volume 128 through the current owner array controller 144 (FIG. 1). If the requesting host device 104 can access the logical data volume 128 through the array controller 144, then the array controller 142, at step 176, returns an error message to the requesting host device 104 indicating that the data access request has been rejected and that the logical data volume 128 is sticky to the array controller 144. As was already determined at step 174, the logical data volume 128 is not actually sticky to the array controller 144, but by informing the host device 104 that the logical data volume 128 is sticky to the array controller 144, the host device 104 is prompted to attempt to reissue the data access request through the array controller 144. Thereby, unnecessary ownership transfer of the logical data volume 128 is avoided. The procedure 158 then ends at step 168.

If the determination at step 192 is negative, indicating that the requesting host device 104 (FIG. 1) cannot access the logical data volume 128 (FIG. 1) through the current owner array controller 144 (FIG. 1), then the array controller 142 (FIG. 1) determines, at step 194, whether the requesting host device 104 has priority over the other host device 106 (FIG. 1) for accessing the logical data volume 128. Priority is determined by conventional methods for setting priority between devices that compete for common resources. Since one of the host devices 104 and 106 would not have access to the logical data volume 128, regardless of which array controller 142 or 144 (FIG. 1) owns the logical data volume 128, the preferable default action is not to transfer ownership, thereby not disturbing the status quo, unless some policy prioritizes the requesting host device 104 over the other host device 106. Therefore, if the determination at step 194 is negative, indicating that the requesting host device 104 does not have priority over the other host device 106, the array controller 142 returns an error message to the requesting host device 104 at step 196. The error message indicates that the data access request was rejected and that the logical data volume 128 is sticky to the other array controller 144. Although it was already determined at step 174 that the logical data volume 128 is not sticky to the other array controller 144, sending a sticky status, nevertheless, will cause the requesting host device 104 to inform the client device 110 (FIG. 1) or application 112 (FIG. 1) of the error or re-issue the data access request to the array controller 142 after waiting for a period of time. The procedure 158 then ends at step 168.

If the determination at step 194 is negative, indicating that the requesting host device 104 (FIG. 1) has priority over the other host device 106 (FIG. 1), the array controller 142 (FIG. 1) transfers ownership of the logical data volume 128 (FIG. 1) from the other array controller 144 (FIG. 1) to itself at step 186 and proceeds as described above.

An exemplary procedure 198 executed primarily by the RDAC software 140 (FIG. 1) on the host devices 104–108 (FIG. 1) for issuing a data access request to one of the array controllers 116–120 and processing a response received therefrom is shown in FIG. 4. The procedure 198 begins at step 200. At step 202, the data access request is generated on behalf of the application 112 (FIG. 1) or one of the client devices 110 (FIG. 1). The data access request includes the preferred data transfer path through the switched fabrics 122 (FIG. 1), the preferred array controller 142 or 144 (FIG. 1) and the desired logical data volume 124–134 (FIG. 1). At step 204, the data access request is issued to the preferred array controller 142 or 144. At step 206, the procedure 198 waits until a response is received. At step 208, it is determined whether the response includes an error message. If not, then the response is processed at step 210, including sending data to the application 112 or the client device 110 or notifying the application 112 or the client device 110 that the data access request was completed. The procedure 198 then ends at step 212.

If the determination at step 208 is positive, indicating that the response included an error message, then at step 214, it is determined whether the received response included the sticky status of the logical data volume 124–134 (FIG. 1). If not, then the error is conventional, which may require the RDAC software 140 (FIG. 1) to return an error to the application 112 or client device 110 (e.g. in the case of a fatal error) or may allow the RDAC software 140 to wait and re-issue the data access request (e.g. in the case of a non-fatal error). Thus, at step 216, it is determined whether the procedure 198 is to wait and re-issue the data access request. If not, then an appropriate error message is returned to the application 112 or client device 110 at step 218. The procedure 198 then ends at step 212. If it is determined at step 216 to wait and re-issue the data access request, however, then the procedure 198 waits for a period of time at step 220 and then proceeds back to step 204 to re-issue the data access request.

If it is determined at step 214 that the sticky status of the logical data volume 124–134 (FIG. 1) was received, then the sticky status indicates that the other array controller 142 or 144 is the current owner array controller 142 or 144 (FIG. 1) to which the logical data volume is sticky. At step 222, it is determined whether the requesting host device 104–108 (FIG. 1) can access the current owner array controller 142 or 144. If so, then the preferred array controller is set to the current owner array controller at step 224, and the procedure returns to step 204 to re-issue the data access request to the new preferred array controller 142 or 144. If the determination at step 222 is negative, however, indicating that the requesting host device 104–108 cannot access the current owner array controller 142 or 144, then the procedure 198 continues at step 216 as described above.

In four exemplary situations shown in FIGS. 5, 6, 7 and 8, both host devices 104 and 106 require access to the logical data volume 128 in the storage bank 102 of the storage array 116 (FIG. 1). The host device 104 has just sent a data access request for the logical data volume 128 to the array controller 142 of the storage array 116. The other host device 106, however, has already established access to the logical data volume 128 through one or the other of the array controllers 142 and 144.

Shown in FIG. 5, the requesting host device 104 has access to the storage array 116 through data transfer paths 226 and 228 to both array controllers 142 and 144, respectively. Likewise, the other host device 106 has access to the storage array 116 through data transfer paths 230 and 232 to both array controllers 142 and 144, respectively. If the other host device 106 had established access to the logical data volume 128 through data transfer path 230 and array controller 142, then when the array controller 142 receives the data access request from the host device 104 at step 162 (FIG. 3A), the array controller 142 determines at step 164 (FIG. 3A) that it owns the logical data volume 128 and then processes the data access request at step 166 (FIG. 3B). On the other hand, if the other host device 106 had established access to the logical data volume 128 through data transfer path 232 and array controller 144, then the array controller 142 determines at step 164 that it does not own the logical data volume 128 and determines at step 170 (FIG. 3A) that the logical data volume 128 is owned by the other array controller 144. If the logical data volume 128 is still sticky to the other array controller 144, then the array controller 142 returns the error to the requesting host device 104 at step 176 (FIG. 3A). Otherwise, if the sticky period has expired, then the array controller 142 determines at step 184 (FIG. 3A) that transfer of ownership of the logical data volume 128 would not eliminate access for the other host device 106, so the array controller 142 makes the ownership transfer at step 186 (FIG. 3B) and proceeds as described above.

Shown in FIG. 6, the requesting host device 104 has access to the storage array 116 through data transfer path 234 to array controller 142, and data transfer path 236 to array controller 144 has failed. The other host device 106, on the other hand, has access to the storage array 116 through data transfer paths 238 and 240 to both array controllers 142 and 144, respectively. In this example, the procedure 158 (FIGS. 3A and 3B) for the array controller 142 to respond to the data access request proceeds the same as for the example shown in FIG. 5. The fact that the data transfer path 236 has failed is irrelevant, since the array controller 142 bypasses the determination at step 192 (FIG. 3A) of whether the requesting host device 104 can access the logical data volume 128 through the other array controller 144.

Shown in FIG. 7, the requesting host device 104 has access to the storage array 116 through data transfer paths 242 and 244 to both array controllers 142 and 144, respectively. The other host device 106, on the other hand, has access to the storage array 116 through data transfer path 246 to array controller 144, and data transfer path 248 to array controller 142 has failed. In this example, the other host device 106 could have established prior access to the logical data volume 128 only through the data transfer path 246 and the array controller 144. Therefore, after the array controller 142 receives the data access request from the requesting host device 104 at step 162 (FIG. 3A) of the procedure 158 (FIGS. 3A and 3B), the array controller 142 determines that it does not own the logical data volume 128 at step 164 (FIG. 3A), and determines that the logical data volume 128 is owned by the other array controller 144 at step 170 (FIG. 3A). If the sticky period for the ownership of logical data volume 128 by the array controller 144 has expired (according to the determination at step 174, FIG. 3A), then the array controller 142 determines (at step 184, FIG. 3A) that transfer of ownership of the logical data volume 128 from the array controller 144 to the array controller 142 would eliminate access to the logical data volume 128 by the other host device 106. The requesting host device 104, however, is determined (at step 192, FIG. 3A) to be able to access the logical data volume 128 through the other array controller 144, so the array controller 142 returns the error status at step 176 (FIG. 3A) and ends the procedure 158 at step 168 (FIG. 3B).

Shown in FIG. 8, the requesting host device 104 has access to the storage array 116 through data transfer path 250 to array controller 142, and data transfer path 252 to array controller 144 has failed. The other host device 106, on the other hand, has access to the storage array 116 through data transfer path 254 to array controller 144, and data transfer path 256 to array controller 142 has failed. In this example, the other host device 106 could have established prior access to the logical data volume 128 only through the data transfer path 254 and the array controller 144. Therefore, after the array controller 142 receives the data access request from the requesting host device 104 at step 162 (FIG. 3A) of the procedure 158 (FIGS. 3A and 3B), the array controller 142 determines that it does not own the logical data volume 128 at step 164 (FIG. 3A), and determines that the logical data volume 128 is owned by the other array controller 144 at step 170 (FIG. 3A). If the sticky period for the ownership of logical data volume 128 by the array controller 144 has expired (according to the determination at step 174, FIG. 3A), then the array controller 142 determines (at step 184, FIG. 3A) that transfer of ownership of the logical data volume 128 from the array controller 144 to the array controller 142 would eliminate access to the logical data volume 128 by the other host device 106. In addition, the requesting host device 104 is determined (at step 192, FIG. 3A) not to be able to access the logical data volume 128 through the other array controller 144, so the array controller 142 determines the priority between the two host devices 104 and 106 at step 194 (FIG. 3B) and continues as described above.

The present invention has the advantage of preventing undesirable thrashing between competing array controllers by reducing the frequency with which the array controllers can transfer ownership of shared logical data volumes at the request of different host devices. Thrashing is prevented by setting a period of time after an ownership transfer of the logical data volume, called the "sticky period," during which ownership cannot be transferred again, until the expiration of the sticky period. In this manner, one host device may have to wait for a second or two before accessing the desired logical data volume, while the other host device has uninterrupted access to the same logical data volume. Overall throughput of data is enhanced over that of the prior art, since the array controllers do not spend as much time performing automatic volume transfer operations.

The present invention also has the advantage of detecting and preventing potential problems that may arise due to the condition of the host-to-storage topology. Before the ownership of the logical data volume is transferred from one array controller to another at the request of a host device, it is determined whether any other host device that has already established access to the logical data volume through one of the array controllers would lose such access. In other words, if the other host device cannot access the logical data volume through the same array controller to which the requesting host device has sent its data access request, then it is preferable not to make the ownership transfer, even if the sticky period has expired. The only exception is when the requesting host device has priority over the other host device for accessing this particular logical data volume. On the other hand, if the requesting host device can access the current owner array controller, then there is no reason to consider priority, since the requesting host device can re-issue its data access request through the current owner array controller. In this manner, unnecessary loss of access to logical data volumes by host devices within the topology is avoided, and excessive ownership transfers of the logical data volumes is prevented.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of accessing a logical data volume in a storage area network having a plurality of host devices and a storage array, the storage array having a plurality of array controllers, the logical data volume being present on the storage array, the plurality of host devices accessing the logical data volume through the plurality of array controllers, comprising the steps of:

receiving at a first array controller a request to access the logical data volume when a second array controller currently has ownership of the logical data volume, the access request requiring a transfer of the ownership of the logical data volume from the second array controller to the first array controller, the access request being issued by one of the plurality of host devices;

determining whether the ownership of the logical data volume by the second array controller is within an exclusive period of time;

upon a determination that the ownership of the logical data volume by the second array controller is within the exclusive period of time, denying the transfer of the ownership of the logical data volume from the second array controller to the first array controller;

upon a determination that the ownership of the logical data volume by the second array controller is not within the exclusive period of time, granting the transfer of the ownership of the logical data volume from the second array controller to the first array controller;

upon the determination that ownership of the logical data volume by the second array controller is not within the exclusive period of time, determining whether the transfer of the ownership of the logical data volume to the first array controller would eliminate access to the logical data volume for a second one of the plurality of host devices to the extent that the physical connections of the second one of the plurality of host devices would not include a connection to any array controller that would have permission to access the logical data volume; and upon a determination that the transfer of the ownership of the logical data volume to the first array controller would not eliminate access to the logical data volume for the second one of the plurality of host devices, granting the transfer of the ownership of the logical data volume from the second array controller to the first array controller.

2. A method as defined in claim 1 further comprising the step of:

upon granting the transfer of the ownership of the logical data volume from the second array controller to the first array controller, starting a second exclusive period of time in addition to the exclusive period of time first aforesaid.

3. A method as defined in claim 1 further comprising the step of:

upon granting the transfer of the ownership of the logical data volume from the second array controller to the first array controller, informing the plurality of host devices that the first array controller has ownership of the logical data volume.

4. A method as defined in claim 1, further comprising the step of:

upon the determination that the ownership of the logical data volume by the second array controller is within the exclusive period of time, sending information to the one of the plurality of host devices that issued the access request that the second array controller has exclusive ownership of the logical data volume.

5. A method as defined in claim 4 further comprising the steps of:

issuing the access request from the one of the plurality of host devices to the first array controller;

receiving at the one of the plurality of host devices the information that the second array controller has exclusive ownership of the logical data volume; and re-issuing the access request from the one of the plurality of host devices to the second array controller.

6. A method as defined in claim 1 further comprising the step of:

sending a query to each of the host devices from the first and second array controllers to determine which of the host devices have access to the first and second array controllers prior to determining whether the transfer of ownership would eliminate access to the logical data volume for the second host device.

7. A method as defined in claim 1 further comprising the steps of:

upon a determination that the transfer of the ownership of the logical data volume to the first array controller would eliminate access to the logical data volume for the second one of the plurality of host devices, determining whether the first one of the plurality of host devices can access the logical data volume through the second array controller; and upon a determination that the first one of the plurality of host devices can access the logical data volume through the second array controller, informing the first one of the plurality of host devices that the second array controller has exclusive ownership of the logical data volume.

8. A method as defined in claim 7 further comprising the steps of:

upon a determination that the first one of the plurality of host devices cannot access the logical data volume through the second array controller, determining whether the first one of the plurality of host devices has priority over the second one of the plurality of host devices for accessing the logical data volume; and upon a determination that the first one of the plurality of host devices has priority over the second one of the plurality of host devices for accessing the logical data volume, granting the transfer of the ownership of the logical data volume from the second array controller to the first array controller.

9. A method as defined in claim 8 further comprising the step of:

upon a determination that the first one of the plurality of host devices does not have priority over the second one of the plurality of host devices for accessing the logical data volume, denying the transfer of the ownership of the logical data volume from the second array controller to the first array controller.

10. A method of accessing a logical data volume in a storage area network having a plurality of host devices and a storage array, the storage array having a plurality of array controllers and storing the logical data volume, wherein the plurality of host devices access the logical data volume through the plurality of array controllers, comprising the steps of:

issuing a request to access the logical data volume from a first host device to a first array controller;

receiving by the first array controller the access request, a second array controller currently having ownership of the logical data volume, the access request requiring a transfer of the ownership of the logical data volume from the second array controller to the first array controller;

determining whether the transfer of the ownership of the logical data volume to the first array controller would eliminate access to the logical data volume for a second host device to the extent that the physical connections of the second host device would not include a connection to any array controller that would have permission to access the logical data volume;

upon a determination that the transfer of the ownership of the logical data volume to the first array controller would eliminate access to the logical data volume for the second host device, denying the transfer of the ownership of the logical data volume from the second array controller to the first array controller; and upon a determination that the transfer of the ownership of the logical data volume to the first array controller would not eliminate access to the logical data volume for the second host device, granting the transfer of the ownership of the logical data volume from the second array controller to the first array controller.

11. A method as defined in claim 10 further comprising the step of:

sending a query to each of the host devices from the first and second array controllers to determine which of the host devices have access to the first and second array controllers prior to determining whether the transfer of ownership would eliminate access to the logical data volume for the second host device.

12. A method as defined in claim 10 further comprising the steps of:

upon a determination that the transfer of the ownership of the logical data volume to the first array controller would eliminate access to the logical data volume for the second host device, determining whether the first host device can access the logical data volume through the second array controller; and upon a determination that the first host device can access the logical data volume through the second array controller, informing the first host device that the second array controller has exclusive ownership of the logical data volume.

13. A method as defined in claim 12 further comprising the steps of:

upon a determination that the first host device cannot access the logical data volume through the second array controller, determining whether the first host device has priority over the second host device for accessing the logical data volume; and upon a determination that the first host device has priority over the second host device for accessing the logical data volume, granting the transfer of the ownership of the logical data volume from the second array controller to the first array controller.

14. A method as defined in claim 13 further comprising the step of:

upon a determination that the first host device does not have priority over the second host device for accessing the logical data volume, denying the transfer of the ownership of the logical data volume from the second array controller to the first array controller.

15. A storage area network having a storage array having a plurality of array controllers and containing a plurality of logical data volumes storing data and the storage area network also having a plurality of host devices for accessing the logical data volumes through the array controllers, comprising:

first and second array controllers disposed in the storage array and controlling access to the logical data volumes, each array controller operative to have ownership of one or more of the logical data volumes, each logical data volume being owned by only one of the array controllers, the ownership of each logical data volume being exclusive for an exclusive period of time, each array controller further operative to transfer the ownership of a shared one of the logical data volumes from the other array controller to itself after expiration of the exclusive period of time for the shared logical data volume and upon receiving a request to access the shared logical data volume;

a first host device connected to the storage array at the first array controller, the first host device operative to access the shared logical data volume, the first host device further operative to issue a first request to access the shared logical data volume to the first array controller; and a second host device connected to the storage array at the second array controller, the second host device operative to access the shared logical data volume, the second host device further operative to issue a second request to access the shared logical data volume to the second array controller; and wherein:
  the first array controller is further operative to establish ownership of the shared logical data volume upon receiving the first request to access the shared logical data volume and to start the exclusive period of time upon the establishment of ownership of the shared logical data volume; and the second array controller is further operative to determine whether the ownership of the shared logical data volume is exclusive to the first array controller upon receiving the second request to access the shared logical data volume, to reject the second request to access the shared logical data volume if ownership is exclusive, and to transfer ownership of the shared logical data volume to the second array controller if the exclusive period of time has expired,
  wherein if the exclusive period of time has expired, the second array controller is further operative to determine whether transfer to itself of the ownership of the shared logical data volume would eliminate access to the shared logical data volume for the first host device to the extent that the physical connections of the first host device would not include a connection to any array controller that would have permission to access the logical data volume; and
  wherein the second array controller is further operative to transfer ownership of the shared logical data volume to itself upon a determination that the transfer of the ownership of the shared logical data volume to itself would not eliminate access to the shared logical data volume for the first host device.

16. A storage area network as defined in claim 15 wherein:

the second array controller is further operative to restart the exclusive period of time upon transferring ownership of the shared logical data volume to the second array controller.

17. A storage area network as defined in claim 16 wherein:

the second array controller is further operative to notify the first and second host devices of the exclusive ownership of the shared logical data volume by the second array controller.

18. A storage area network as defined in claim 15 wherein:

the first and second array controllers are further operative to send a query to each of the host devices to determine which of the host devices have access to the first and second array controllers and to determine whether the transfer of ownership would eliminate access to the logical data volume for the first host device.

19. A storage area network as defined in claim 15 wherein:

the second array controller is further operative to determine whether the second host device can access the shared logical data volume through the first array controller upon a determination that the transfer of the ownership of the shared logical data volume to the second array controller would eliminate access to the shared logical data volume for the first host device.

20. A storage area network as defined in claim 19 wherein:

the second array controller is further operative to reject the second request to access the shared logical data volume upon a determination that the second host device can access the shared logical data volume through the first array controller.

21. A storage area network as defined in claim 20 wherein:

the second array controller is further operative to determine whether the second host device has priority over the first host device for accessing the shared logical data volume upon a determination that the second host device cannot access the shared logical data volume through the first array controller; and the second array controller is further operative to transfer ownership of the shared logical data volume to itself upon a determination that the second host device has priority over the first host device for accessing the shared logical data volume.

* * * * *